United States Patent [19]

Mostyn et al.

[11] 4,089,988

[45] May 16, 1978

[54] STARCH BASED DESSERT COMPOSITION

[75] Inventors: William Max Mostyn; Roger Percy Verrall; Brian Clifford Shrimpton, all of Banbury, England

[73] Assignee: General Foods Ltd., Banbury, England

[21] Appl. No.: 742,476

[22] Filed: Nov. 17, 1976

[51] Int. Cl.$^2$ .................. A23L 1/187; A23L 1/195
[52] U.S. Cl. .................................. 426/578; 426/661
[58] Field of Search ............... 426/578, 285, 453, 661

[56] References Cited

U.S. PATENT DOCUMENTS

| | | | |
|---|---|---|---|
| 2,045,019 | 6/1936 | Lorenzen | 426/578 |
| 3,100,909 | 8/1963 | Schapiro | 426/661 |
| 3,143,428 | 8/1964 | Reimers et al. | 426/285 |

*Primary Examiner*—Jeanette M. Hunter
*Attorney, Agent, or Firm*—Thomas V. Sullivan; Howard J. Newby; Mitchell D. Bittman

[57] ABSTRACT

A custard mix in the form of free-flowing granules which will instantly disperse in a hot liquid to form a thickened, uniform sauce is attained by controlled moisturization of the starch and sugar ingredients during blending and granulation.

5 Claims, No Drawings

STARCH BASED DESSERT COMPOSITION

This invention relates to a dessert composition and more particularly to a starch-containing composition in a dried, granular and free-flowing form, which is adapted to disperse instantly in a hot liquid to form a thickened sauce or dessert.

Desserts or sauces based substantially on starch with added color and flavor are well known, of which custard made from custard powder and hot milk is a particular and well-known example. Custard powder is now normally substantially composed of starch, which in order to form a custard sauce, whether eventually served hot or cold by the housewife, needs to be fully gelatinized by heat on the addition of hot milk with stirring. This preparation, however, has to be conducted with great care in order that a smooth, thick sauce of uniform texture without lumps is obtained. In the hands of an inexperienced housewife, this smooth texture may not be readily obtained, since the temperature of starch gelatinization may not be fully attained, and the starch powder may not be properly wetted out. Indeed, it is usually recommended that a small quantity of cold milk or water is first used to form a paste, before the major quantity of the hot milk is stirred in, which can be an inconvenient two-state culinary operation. It is often necessary to reheat the mix. Furthermore, custard powder, being composed of very fine particles, is not free-flowing, which makes it difficult to dispense in correct amounts.

Various methods have been proposed in the past to overcome this disadvantage, but they all make use of additives, such as various hydrocolloids or gelatine, which may not be otherwise desired to keep the nature of the custard composition to be sold and consumed.

Free-flowing and more wettable compositions may be obtained in many products by the process of agglomeration; but this expedient is not readily available for a custard or other sauce based on 100% starch (apart from flavoring and coloring). A made-up custard by the housewife almost always contains sugar, and an improved custard powder containing both starch and sugar may be agglomerated. Such a product, however, is still not entirely satisfactory, when, for example, the particles may be rather fragile.

It has now been found that a superior custard may be prepared in the form of free-flowing granules, which will instantly disperse in a hot liquid to form a thickened, uniform sauce of the same characteristics as that prepared from a custard powder by the two-stage culinary procedure already described.

According to the present invention there is provided a process for the preparation of a dessert composition in a dried, granular and free-flowing form, which comprises admixing starch powder and sugar particles while spraying water in a controlled manner on the mixed particles to provide a moisture content of 13 to 18% by weight, granulating the moistened mixture, drying the resultant granules to a moisture content of 5 to 6% by weight, and grinding and screening the dried granules to a particle size from No. 10 to No. 36 British Standard Mesh.

The invention also provides a dessert composition in a dried, granular and free-flowing form whenever prepared by a process as described above.

In performing the process of this invention, granulation is accomplished on a mixture of starch and sugar. The sugar should be of similar particle size to the starch powder, normally used, so that commercially pulverized sugar is preferably employed and thoroughly mixed with the starch powder. During the mixing operation, water is sprayed on in a controlled manner, to a final moisture content of the mix which has been found to be critical. Too low a moisture content will not allow the subsequent granulation to be satisfactorily performed, nor provide a final product of satisfactory particle strength. Too high a moisture content produces a paste which cannot be satisfactorily granulated, and may give hard gritty particles. The moistened mix is then granulated preferably by being passed or extruded under a low applied mechanical pressure through small orifices (for example, of 0.1 inch diameter), to form small roughly shaped pellets or granules. These granules are then dried to the equilibrium moisture content for subsequent satisfactory storage of the produce. The dried granules are then ground and screened, so that the final product has a particle range from No. 10 to No. 36 British Standard Mesh.

Various items of equipment may be used to carry out the process in which the critical aspects are the moisture content of the mix, the conditions of granulation, e.g., extrusion, and the particle size of the product. If the pressure of extrusion is too high, though increased hardness of the final may be attained, the product may be gritty in texture on make-up. This effect would result primarily from the associated heat generated during the extrusion, which it is essential to avoid. Many extruders, however, act by a continuously applied and relatively high pressure, as within a tapering barrel and screw, which are unsatisfactory for the product of this invention. The preferred manner of performing the granulation is by applying a relatively low pressure over a short time during the actual extrusion, and not during the total time of residence in the extrusion device. The size of the orifice holes is related to moisture content of the mixture, the higher the moisture content the larger the size of holes that may be used. A few simple trials will readily establish the optimal moisture content within the range of 13 to 18% by weight to give the product of this invention in the device chosen.

In a preferred embodiment of this invention a mixture of 50% maize starch and 50% of pulverized sugar by weight is blended in a helical ribbon-blender trough mixer with added coloring and flavoring as required. After or during mixing, the correct amount of moisture is sprayed on to the surface of the mixture within the mixer with its blades still rotating to ensure a uniform distribution of the water. Pneumatic spray or other nozzles which provide a fine spray will be found satisfactory for this purpose. The amount of water to be incorporated, for a normal starch moisture content of 12%, and sugar moisture of less than 1% is from 14 to 15% by weight. The moistened mixture is then fed to a granulator, for example, a granulator made by the Apex Construction Company (Rotary Wet Granulator) which has been fitted with a standard screen supplied with this equipment having holes of 0.097 inch diameter. In this granulator, the screen is in the form of a cylindrical vertically positioned band, in a chamber fitted with three rotating blades radially shaped so that the moistened mixture carried along by each blade is progressively pushed through the screen holes during the passage of these blades. The space in front of each blade is kept continuously filled from a small constant head by an agitator above. Extrusion is therefore intermittent from each of the holes. The inner surface of the screen is clean immediately after the passage of each blade. The three blades are rotated from a vertical spindle, which also carries the agitator. The moist extruded granules are then dried to the equilibrium moisture content of the mix which is 5 to 6% by weight. The granules are then ground, for which twin crushingrolls are suitable. The ground product is then sized by means of a suitable sifter, to give a product of particle size between through No. 10 British Standard Mesh and on No. 36, with the average preferably towards the smaller size. The grinding operation should be controlled to give the minimum quantity of fines below No. 36 mesh, but such fines may be further milled to feed particle size and recycled. Oversize product (i.e., above No. 10 mesh) is recycled to the crushing rolls.

The finished composition on the addition of hot milk (50g to 1 pint) disperses very readily, and the resultant made-up custard is smooth in texture and indistinguishable from a product made with a powdered mix of similar composition. The sweetness level of this product is also generally acceptable.

Formulations suitable for the compositions of this invention cover a range of starch - sugar mixtures, from 30 to 80% by weight sugar, with the preferred product at 50%. The higher proportions of sugar are easier to granulate, but may give an unacceptably high sweetness level, whereas lower proportions of sugar are more difficult to granulate. It will be appreciated that 100% starch compositions cannot be satisfactorily granulated.

The following Example illustrates the invention and the manner in which it may be performed.

EXAMPLE

Dry ingredients in the following proportions were used:

|  | percentage |
|---|---|
| Corn Starch | 49.5 |
| Pulverised Sugar | 49.5 |
| Minor Ingredients (salt, colour, flavours) | 1.0 |
|  | 100.0 |

The relevant aspects of the raw material specifications are:

| For Corn Starch: | Bulk Density: | 52-60g/100 cc |
|---|---|---|
|  | Particle Size: | 1% max. on 150 mesh screen |
|  | Moisture: | 10-12% wet basis |
| For Pulverised Sugar: | Bulk Density: | 52g/100 cc |
|  | Particle Size: | 95% min. thro' 60 mesh screen |

A 40 kilogramme batch containing the ingredients in the above proportions was first sifted through a 40 mesh screen to remove oversize material then blended in a Ribbon blender for 6 minutes. The blender was fitted with a 16 inch diameter ribbon rotating at 65 r.p.m. The blender was fitted with a variable speed drive, and, after the preliminary mixing operation, the rotation speed was increased to 200 r.p.m. This had the effect of fluidizing the mix, thus making the subsequent water dispersion most effective. Water was sprayed on over a period of 5 minutes via two Delavan-Watson 'Spraycone' nozzles. The water addition time was based on a desired wet mix moisture of 15% and a predetermined spray rate of 20 ml/min/kg. of wet mix for a water pressure of 50 psig. After the water addition, the wet mix was further blended for 5 minutes (blender speed 65 rpm) to ensure total dispersion. The mix was discharged from the blender and fed at a rate of approx. 100 kg/1 hour in an Apex 52 RACH Rotary Wet Granulator, fitted with a perforated screen. The diameter of these holes was 0.097 inches. The moist granules were collected in trays and dried in a Proctor and Schwartz forced circulation dryer. The conditions employed in this dryer were: up-through circulation, 125° F, 1¼ inches bed depth and the drying time, to a final moisture of 5% was 30 minutes. The dry granules were sized through 2 inches diameter crushing rolls, and then screened using both 10 and 35 mesh screens. The rolls were adjusted to ensure maximum recovery in the screening operation. Oversize material from the screen was recycled to the crushing rolls and fines, after milling, were stored for use in subsequent batches up to a level of incorporation of 25%. The actual level of fines produced from this batch was 21%.

Product produced in this manner was then made up as follows:

A pint of milk was heated just to boiling, then removed from the heat. Immediately 65g. of the granulated product was sprinkled on whilst stirring and stirring was continued until the product had thickened to a smooth custard.

What is claimed is:

1. A process for the preparation of a dessert composition in a dried, granular and free-flowing form, which comprises admixing starch powder and sugar particles while spraying water in a controlled manner on the mixed particles to provide a moisture content of 13 to 18% by weight, granulating the moistened mixture by extrusion, drying the resultant granules to a moisture content of 5 to 6% by weight, and grinding and screening the dried granules to a particle size from No. 10 to No. 36 British Standard Mesh.

2. A process according to claim 1, in which the initial mixture comprises 30 to 80% by weight of sugar and the balance starch, apart from flavor and color ingredients.

3. A process according to claim 2 in which the sugar content is substantially 50% by weight.

4. A process according to claim 1, in which the amount of water incorporated in the mixture is 14 to 15% by weight.

5. A process according to claim 1, in which the granulation of the moistened mixture is effected by extruding the mixture through a granulator fitted with a standard screen having holes of 0.097 inch diameter.

* * * * *